US011255563B2

(12) United States Patent
Lee (10) Patent No.: US 11,255,563 B2
(45) Date of Patent: Feb. 22, 2022

(54) AIR CONDITIONER AND METHOD FOR OPERATING THE AIR CONDITIONER (71) Applicant: LG ELECTRONICS INC., Seoul (KR)

(72) Inventor: Hyo Sung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/561,886

(22) Filed: Sep. 5, 2019

(65) Prior Publication Data
US 2019/0390867 A1    Dec. 26, 2019

(30) Foreign Application Priority Data

Jul. 3, 2019 (KR) .................. 10-2019-0080102

(51) Int. Cl.
| F24F 11/62 | (2018.01) |
| F24F 11/58 | (2018.01) |
| B60H 1/32 | (2006.01) |
| H04L 67/12 | (2022.01) |

(52) U.S. Cl.
CPC ............ F24F 11/58 (2018.01); B60H 1/3205 (2013.01); F24F 11/62 (2018.01); H04L 67/12 (2013.01)

(58) Field of Classification Search
CPC ........ F24F 11/58; F24F 11/62; F24F 2130/10; F24F 11/64; B60H 1/3205; B60H 1/00964; B60H 1/00735; B60H 1/00657; B60H 1/00742; H04L 67/12
USPC ........................................................ 700/276
See application file for complete search history.

(56) References Cited

U.S. PATENT DOCUMENTS

| 9,714,771 | B1* | 7/2017 | Goodman ............ G05B 19/041 |
| 2016/0061472 | A1* | 3/2016 | Lee ........................ G05B 15/02 |
| | | | 700/276 |
| 2017/0213150 | A1* | 7/2017 | Arel ...................... G06N 3/0427 |
| 2017/0234562 | A1* | 8/2017 | Ribbich ............. G05D 23/1923 |
| | | | 700/277 |
| 2018/0283723 | A1* | 10/2018 | Ock ........................ F24F 11/63 |

FOREIGN PATENT DOCUMENTS

| KR | 10-2012-0081816 A | 7/2012 |
| KR | 10-2019-0055954 A | 5/2019 |

* cited by examiner

Primary Examiner — Kenneth M Lo
Assistant Examiner — Michael W Choi
(74) Attorney, Agent, or Firm — Birch, Stewart, Kolasch & Birch, LLP

(57) ABSTRACT

An air conditioner which is controlled to operate by executing an artificial intelligence (AI) algorithm and/or a machine learning algorithm in a 5G environment connected for the Internet of Things and an operating method of an air conditioner are provided. The air conditioner includes a communicator, a command input, an operation manipulator, and a controller. The communicator collects weather information and operation information of at least one connected devices. The command input receives a manipulation command of a user. An operation manipulator adjusts at least one of whether to operate the air conditioner for cooling/heating, a temperature, a wind volume, or a wind direction of the air conditioner. The controller derives a first customized value based on a manipulation command input by the command input and information collected by the communicator and controls the operation manipulator in accordance with the first customized value.

12 Claims, 8 Drawing Sheets

| FIRST DATA SET | | OVEN | TV | CLEANER | TREADMILL | BOILER | AIR PURIFIER | ..... | FIRST CUSTOMIZED SETTING |
|---|---|---|---|---|---|---|---|---|---|
| WHETHER TO OPERATE | | ON | ON | OFF | OFF | ON | OFF | ..... | 0 → COOK |
| | | OFF | ON | OFF | ON | ON | OFF | ..... | 1 → EXERCISE |
| | | OFF | OFF | OFF | OFF | OFF | OFF | ..... | 2 → GOING OUT |

FIG. 7

| ENVIRONMENT DATA | | WEATHER INFORMATION | | SECOND DATA SET | | SECOND CUSTOMIZED SETTING |
|---|---|---|---|---|---|---|
| INDOOR TEMPERATURE | INDOOR HUMIDITY | OUTSIDE TEMPERATURE | OUTSIDE HUMIDITY | POSITION INFORMATION (OUTDOOR ACTIVITY) | BIOMETRIC INFORMATION | |
| 1 HOT | 1 HUMID | 1 HOT | 1 HUMID | 1 DONE | 1 IT IS HOT | |
| 1 | 0 | 1 | 1 | 0 | 0 | SETTING 1 → COOLING, WEAK WIND, AUTOMATIC WIND DIRECTION |
| 0 | 0 | 0 | 0 | 0 | 0 | SETTING 2 → HEATING, WEAK WIND, LEFT WIND |
| 0 | 1 | 0 | 1 | 1 | 0 | SETTING 3 → DEHUMIDIFICATION, WEAK WIND, AUTOMATIC WIND DIRECTION |

FIG. 8

AIR CONDITIONER AND METHOD FOR OPERATING THE AIR CONDITIONER

CROSS-REFERENCE TO RELATED APPLICATION

This present application claims benefit of priority to Korean Patent Application No. 10-2019-0080102, entitled "AIR CONDITIONER AND METHOD FOR OPERATING THE AIR CONDITIONER," filed on Jul. 3, 2019, in the Korean Intellectual Property Office, the entire disclosure of which is incorporated herein by reference.

BACKGROUND

1. Technical Field

The present disclosure relates to an air conditioner and a method for operating the same, and more particularly, to an air conditioner which provides a cooling and heating environment suitable for a user's condition through machine learning on weather information and data collected through an Internet-of-Things-based home appliance, a wearable device, a vehicle and a portable terminal and a method for operating the air conditioner.

2. Description of the Related Art

Generally, the air conditioner is installed in an indoor space. The air conditioner serves to increase or lower the temperature of the indoor space.

A heating medium circulates through a path determined in the air conditioner and the circulating heating medium emits or absorbs thermal energy. In the air conditioner, the heating medium transmits the thermal energy and performs the heating by emitting the thermal energy and performs the cooling by absorbing the thermal energy. Further, the air conditioner also has an air purifying function, a humidifying function, and a dehumidifying function.

The air conditioner not only adjusts the temperature of the predetermined indoor space but also provides a pleasant environment to the user by purifying indoor air and adjusting a humidity.

However, most air conditioners are controlled such that a desired temperature is input by a user. Therefore, when the input desired temperature is lower than the measured indoor temperature, the cooling is performed and when the input desired temperature is higher than the measured indoor temperature, the heating is performed.

As a related art, Korean Unexamined Patent Application Publication No. 10-2019-0055954 (hereinafter, referred to as a related art 1) discloses "an air conditioner and a control method thereof".

The related art 1 includes a power unit to which a set temperature is input, an indoor temperature sensor which detects an indoor temperature, and a controller which receives information and a command from the indoor temperature sensor to control the driving of a compressor.

According to the control method of a compressor disclosed in the related art 1, when a user inputs a desired set temperature, a difference between the input set temperature and the indoor temperature is calculated and the compressor is controlled to operate in accordance with the difference. However, according to the control method of the air conditioner, the compressor is controlled by inputting only a simple command so that the indoor environment, which varies depending on an activity occurring in the indoor space and the state of the user, cannot be delicately managed.

As another related art, Korean Unexamined Patent Application Publication No. 10-2012-0081816 (hereinafter, referred to as a related art 2) discloses "a control method of a network device".

The related art 2 discloses a control method of a network device which includes a portable terminal and an air conditioner which communicates with the portable terminal.

According to the related art 2, the air conditioner obtains environmental information by means of the portable terminal and operates in accordance with the obtained environmental information. Therefore, it is possible to manipulate the air conditioner by means of the portable terminal at a relatively long distance in which the air conditioner cannot be controlled by a remote controller or obtain weather information of a specific region to perform the cooling and the heating in accordance with the weather information.

However, the environmental information obtained in related art 2 is information limited to the outdoor space so that it is not efficient to cool or heat a specific indoor space. Further, according to related art 2, the environmental information of the outdoor is obtained to control the air conditioner so that accuracy is low in determining the state of the indoor space.

The above-described related arts are technical information possessed by the inventor for the contents to be disclosed or learned by the inventor in the course of deriving the contents to be disclosed so that it cannot be referred to as known arts disclosed to the general public prior to the filing of the contents to be disclosed.

SUMMARY OF THE INVENTION

An object of the present disclosure is to perform the cooling or the heating by predicting the change of an indoor temperature in advance when an activity such as cooking or exercise which influences on the indoor temperature is performed.

Another object of the present disclosure is to reduce the consumption of the electrical energy by preventing overrunning situations that may occur if it is controlled only by the set temperature.

Still another object of the present disclosure is to perform the cooling or the heating by precisely figuring out a requested temperature of a user who returns to the indoor after outdoor activity.

Still another object of the present disclosure is to increase accuracy of predicting a requested temperature of the user as a total accumulated operating time is increased, by collecting data through devices such as home appliances, wearable devices, vehicles, and portable terminals and repeatedly learning the collected data.

Still another object of the present disclosure is to provide an air conditioner which is automatically controlled to be focused on the user by collecting various information related to the user from Internet of Things-based electronic devices, wearable devices, vehicles, and portable terminals using 5G environment communication and performing a machine learning algorithm with the collected information.

The objects of the present disclosure are not limited to those described above, and other tasks or objects not mentioned may be understood by the following description.

According to an exemplary embodiment of the present disclosure, an air conditioner cools or heats a predetermined conditioning area. To this end, the air conditioner includes a communicator, a command input, an operation manipulator, and a controller. The communicator collects weather information and operation information of each of a plurality of connected devices. The command input receives a manipulation command of a user. An operation manipulator adjusts at least one of whether to operate for cooling/heating, a temperature, a wind volume, and a wind direction.

The controller derives a first customized value based on the manipulation command input by the command input and information collected by the communicator and controls the operation manipulator in accordance with the first customized value.

In the air conditioner according to an exemplary embodiment of the present disclosure, the communicator includes a first communicator and a second communicator. The first communicator accesses a server using wireless communication and collects weather information. The second communicator receives operation information of each of connected devices. The controller performs deep learning with the operation information of each of the connected devices to predict a state of the conditioning area to determine a first customized value.

In the air conditioner according to an exemplary embodiment of the present disclosure, the controller considers the operation information of each of the connected devices as a first data set and analyzes the first data set with a deep learning model trained by unsupervised learning.

In the air conditioner according to an exemplary embodiment of the present disclosure, the communicator further includes a third communicator which collects position information of the user and biometric information of the user. Further, the controller corrects the first customized value based on the position information of the user and the biometric information of the user collected by the third communicator to calculate a second customized value and controls the operation manipulator in accordance with the second customized value, and the second customized value is applied preferentially to the first customized value.

In the air conditioner according to an exemplary embodiment of the present disclosure, the position information and the biometric information of the user are measured by at least one of a vehicle on which the user is boarding and a wearable device worn by the user.

In the air conditioner according to an exemplary embodiment of the present disclosure, the second customized value is derived by performing deep learning to select at least one of a plurality of manipulation settings obtained by combination of whether to operate, a temperature, a wind volume, and a wind direction with the first customized value, the position information, and the biometric information of the user as input values.

In the air conditioner according to an exemplary embodiment of the present disclosure, each of the connected devices is a home appliance having a function of the Internet of Things.

In the air conditioner according to an exemplary embodiment of the present disclosure, the controller performs reinforcement learning based on additional manipulation information of the user which is input through the command input in a state in which the operation manipulator is controlled in accordance with the first customized value and updates the first customized value such that the difference between the additional setting changed by the additional manipulation information and the first customized value is reduced.

In the air conditioner according to an exemplary embodiment of the present disclosure, the controller performs reinforcement learning based on additional manipulation information of the user which is input through the command input in a state in which the operation manipulator is controlled in accordance with the second customized value and updates the second customized value such that the difference between the additional setting changed by the additional manipulation information and the second customized value is reduced.

In the air conditioner according to an exemplary embodiment of the present disclosure, a controller includes a learning processor which performs machine learning using information input through at least one of the first communicator, the second communicator, and the command input to calculate the first customized value; and a memory in which a learning model which is referred to by the learning processor and the first customized value calculated by the learning processor are stored.

In the air conditioner according to an exemplary embodiment of the present disclosure, the learning model includes a deep learning model which is a learning model for performing deep learning; and a reinforcement learning model which is a learning model for performing reinforcement learning. The learning processor learns by selectively referring to the deep learning model and the reinforcement learning model from the memory and updates an algorithm of the deep learning model or the reinforcement learning model in accordance with the learning to store the algorithm in the memory.

An operating method of an air conditioner according to an exemplary embodiment of the present disclosure is a method for operating an air conditioner using information collected by external devices.

To this end, in a first step, weather information and environment data including a temperature and a humidity of a conditioning area where the air conditioner is installed are collected.

In a second step, a first data set which is operation information of each of a plurality of connected devices located in the conditioning area is collected.

In a third step, a first customized value is calculated based on the environment data and the first data set.

In a fourth step, a second customized value is calculated by modifying the first customized value based on a second data set which is position information and biometric information of the user.

In a fifth step, at least one of whether to operate the air conditioner, an operation mode, a wind volume, and a wind direction is controlled in accordance with the first customized value or the second customized value.

In a sixth step, when additional manipulation information is input by a user, the first customized value or the second customized value is updated based on the additional manipulation information.

In the operating method of an air conditioner according to an exemplary embodiment of the present disclosure, in the third step, a combination of whether to operate the air conditioner, the operation mode, the wind volume, and the wind direction predicted by performing deep learning with the first data set as an input value is selected as the first customized value.

In the operating method of an air conditioner according to an exemplary embodiment of the present disclosure, in the fourth step, a combination of whether to operate the air conditioner, the operation mode, the wind volume, and the wind direction predicted by performing deep learning with the second data set as an input value is selected as the second customized value.

In the operating method of an air conditioner according to an exemplary embodiment of the present disclosure, in the sixth step, the first customized value or the second customized value is updated such that a difference between the additional setting changed by the additional manipulation information and the first customized value or the second customized value is reduced.

According to the present disclosure, the temperature change of the indoor space is detected in advance to perform the cooling or the heating in advance, thereby providing a pleasant indoor environment.

According to the present disclosure, the operation is controlled in accordance with the environment change of the indoor space to reduce an unnecessary operation, thereby saving the electrical energy.

According to the present disclosure, an indoor temperature required for the user is derived from an activity state and a body condition of the user and thus the cooling or the heating is performed to provide the cooling and the heating customized for the personal and the situation.

According to the present disclosure, a predictive algorithm is repeatedly updated by measured data and a feedback of the user to improve accuracy on the prediction as the usage period has elapsed.

According to the present disclosure, various information related to the user is collected from Internet of Things-based electronic devices, wearable devices, vehicles, and portable terminals using the 5G environment communication and a machine learning algorithm is performed with the collected information so that user-focused automatic control is performed.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

Figure 1:
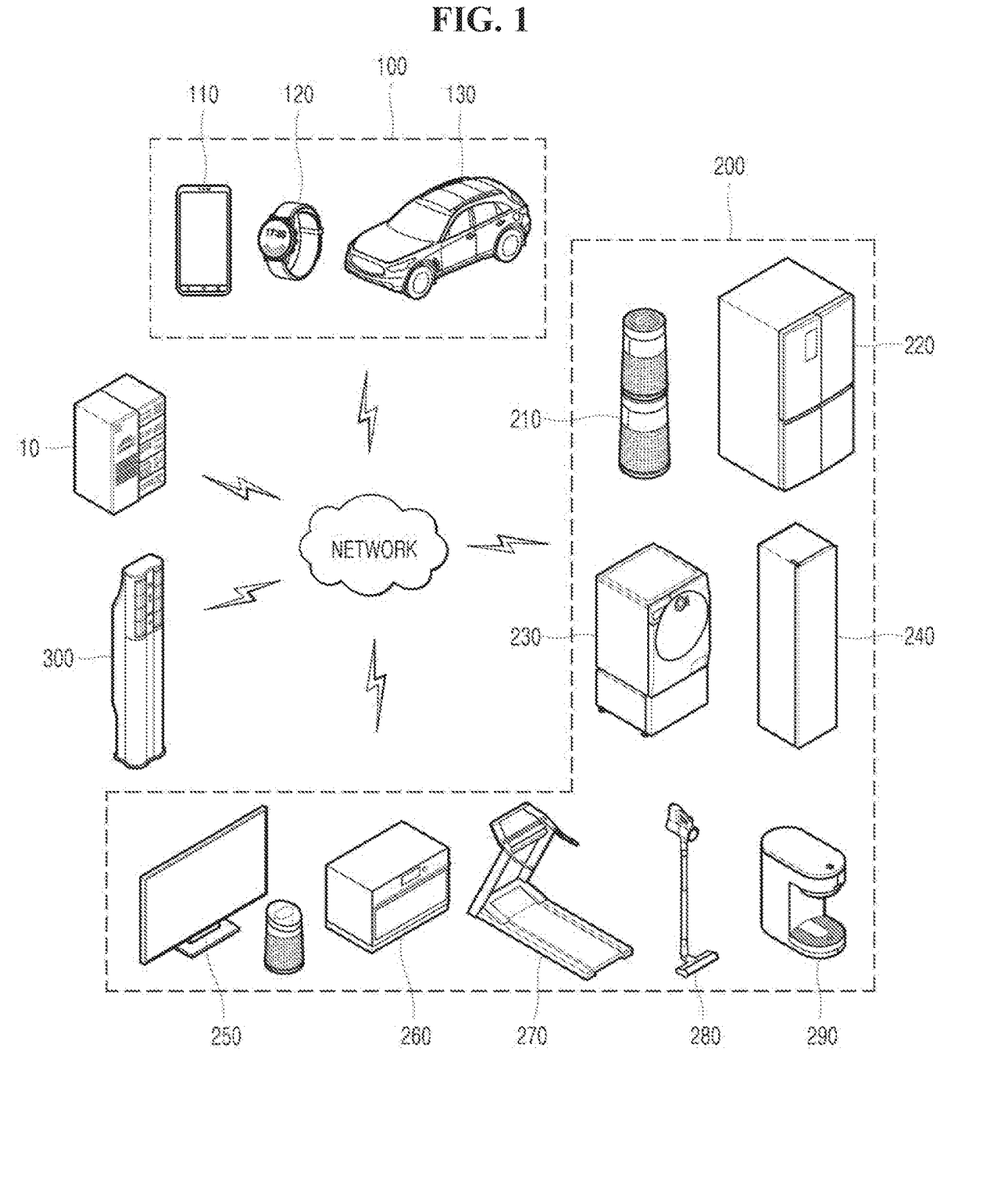
FIG. 1 is an exemplary view of an air conditioner control environment including an air conditioner according to an exemplary embodiment of the present disclosure, a mobile device, a home appliance, a server, and a network which connects the above components.
Figure 2:
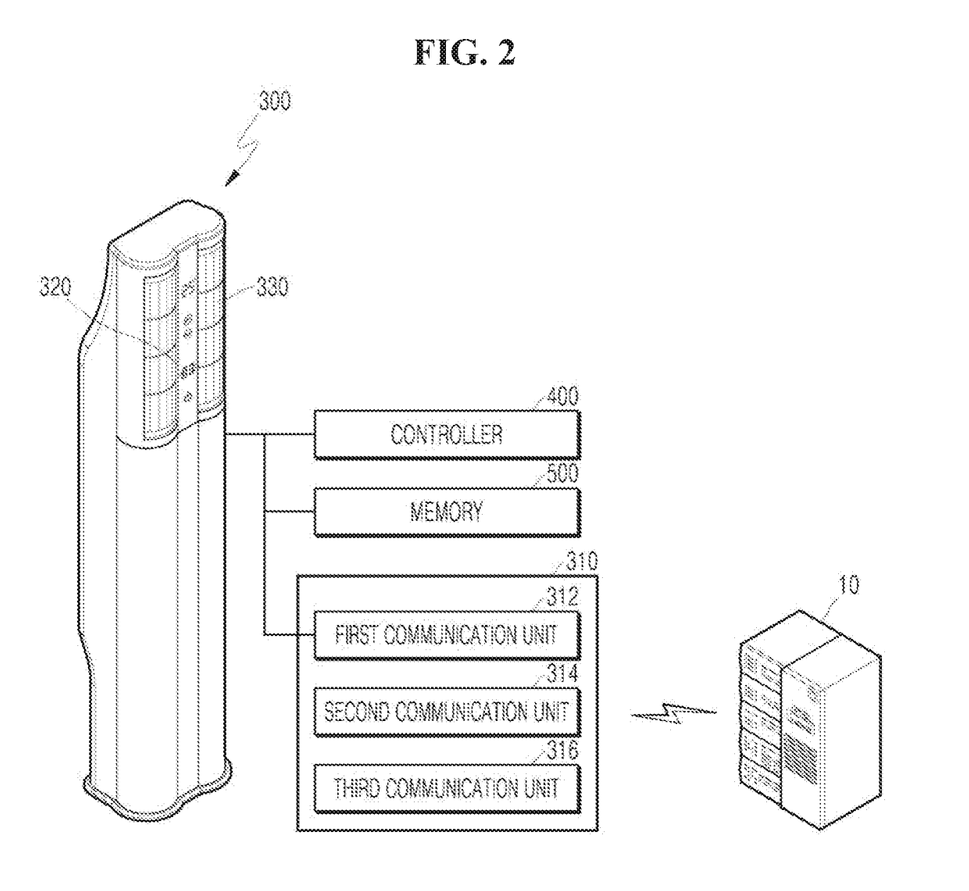
FIG. 2 is an exemplary view of a communication environment between an air conditioner according to an exemplary embodiment of the present disclosure and a server.
Figure 3:
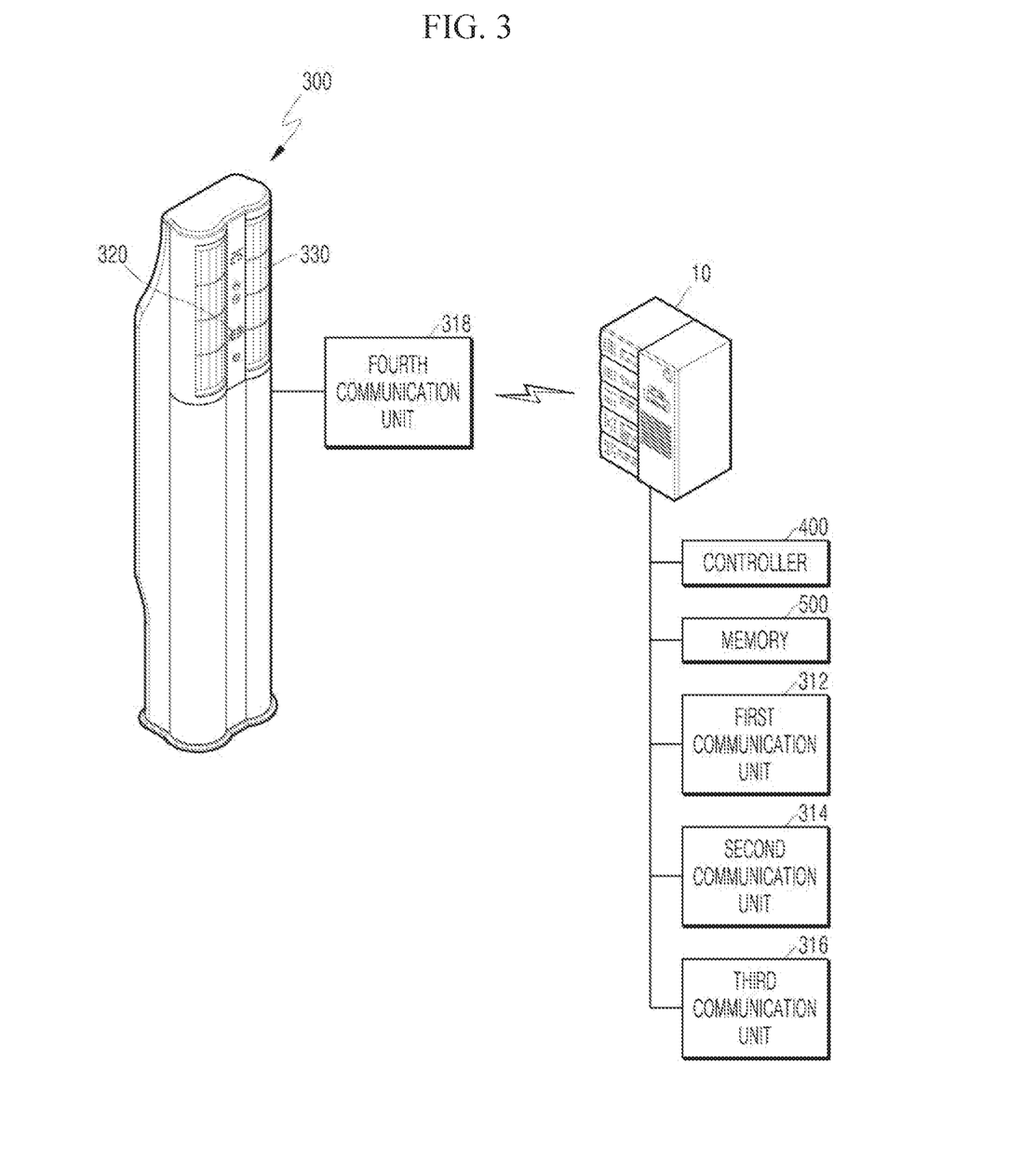
FIG. 3 is an exemplary view of a communication environment between an air conditioner according to another exemplary embodiment of the present disclosure and a server.

FIG. 1 is an exemplary view of a control environment of an air conditioner 300 including an air conditioner 300 according to an exemplary embodiment of the present disclosure, a mobile device 100, a connected device 200, a server 10, and a network which connects the above components, FIG. 2 is an exemplary view of a communication environment between an air conditioner 300 according to an exemplary embodiment of the present disclosure and a server 10, and FIG. 3 is an exemplary view of a communication environment between an air conditioner 300 according to another exemplary embodiment of the present disclosure and a server 10.

As illustrated in FIGS. 1 and 3, the control environment of the air conditioner 300 according to the present disclosure includes an air conditioner 300, a mobile device 100, a connected device 200, a server 10, and a network.

The air conditioner 300 performs heat-exchange by means of a refrigerant which circulates therein and an outdoor unit.

The refrigerant undergoes phase changes through evaporation and condensation and utilizes heat absorption or heat emission generated by the phase change of the refrigerant for cooling and heating the indoor space.

The air conditioner 300 may be installed in the indoor space and cool and heat a conditioning area having a predetermined area.

According to an exemplary embodiment of the present disclosure, the air conditioner 300 includes a controller 400, a memory 500, and a communicator 310. The air conditioner includes a command input 320 to which a command of the user is input and an operation manipulator 330 which adjusts at least one of whether to operate the air conditioner 300, a temperature, a wind volume, and a wind direction.

The air conditioner 300 according to an exemplary embodiment of the present disclosure exchanges data with the mobile device 100 and the connected device 200 by means of the server 10.

The mobile device 100 includes a portable terminal 110, a wearable device 120, and a vehicle 130.

The air conditioner 300 receives information of the portable terminal 110 to register the portable terminal 110 of the user and receives a GPS signal of the user from the registered portable terminal 110 to collect position change data of the user.

Further, the air conditioner 300 communicates with the registered wearable device 120 and receives biometric information such as a body temperature and a heart rate of the user from the wearable device 120.

The air conditioner 300 according to an exemplary embodiment of the present disclosure may communicate with the vehicle 130. The air conditioner 300 collects movement information of the vehicle 130 and detects a user's action which returns to an indoor space where the air conditioner 300 is installed by collecting the movement information of the vehicle 130.

According to the present disclosure, the connected device 200 refers to Internet-of-Things-based household electrical appliances equipped to be communicable with the server 10 or the air conditioner 300.

The connected device 200 may include an air purifier 210, a refrigerator 220, a washing machine 230, a clothing care device 240, a TV 250, a cooker 260, a treadmill 270, a cleaner 280, and a water purifier 290 which are equipped to be communicable with the server 10 or the air conditioner 300.

The connected devices 200 transmit operating states to the server 10 and receive operating states of other connected devices 200 from the server 10.

The information exchange or information collection between the air conditioner 300 and the mobile device 100 and between the air conditioner 300 and the connected devices 200 may be performed by means of the server 10.

The server 10 may be a server 10 of a database 520 which provides big data required to apply various artificial intelligence algorithms and data operating the air conditioner 300.

Here, the artificial intelligence (AI), which is a field of computer engineering and information technology that researches how computers can do thinking, learning, and self-development that can be done by human intelligence, may refer to a technique which allows a computer to imitate the intelligent behavior of the human.

Further, the artificial intelligence does not exist by itself, but has a lot of direct or indirect relationship with other areas of computer science. Specifically, in modern society, artificial intelligent elements are introduced to various fields of information technology so that attempts to utilize the artificial intelligent elements to solve the problems in those fields are actively performed.

Machine learning is one field of artificial intelligence and includes a study field which applies an ability to a computer to learn without having an explicit program.

Specifically, the machine learning may refer to a technique which studies and constructs a system which learns, predicts, and improves a performance based on empirical data and an algorithm therefor. Algorithms of the machine learning may construct a specific model to derive prediction or decision based on the input data, rather than perform static program commands which are strictly determined.

The server 10 may transmit and receive signals to and from the air conditioner 300. Specifically, the air conditioner 300 may download, from the server 10, movement information, biometric information of the user, movement information of the vehicle 130, and operation information of the connected devices 200 which are input from the mobile device 100 and/or the connected device 200 to the server 10.

As illustrated in FIG. 2, the above-described operation may be performed by the communicator 310.

According to an exemplary embodiment of the present disclosure, as illustrated in FIG. 2, the server 10 may serve to store information collected from the mobile device 100 and the connected devices 200.

The communicator 310 may download position information, movement information, biometric information of the user and usage information of the vehicle 130 collected from the server 10 by means of the mobile device 100 and also download operation information of the connected devices 200 collected by means of the connected devices 200. In addition, weather information of a region where the air conditioner 300 is installed and weather information of a path where the user moves may be further downloaded.

The controller 400 may analyze the collected information through the machine learning and control the air conditioner 300 using the result.

Controlling the air conditioner 300 may include controlling an operation manipulator 330 which adjusts at least one of whether to operate for the cooling or the heating, a temperature, a wind volume, and a wind direction. When the cooling or heating is performed, a target temperature for cooling or heating is derived and the operation manipulator 330 which cools or heats a conditioning area to a derived target temperature may be controlled.

In this case, the controller 400 may include a learning processor 410 and the learning processor 410 analyzes collected information by referring to a machine learning model stored in the memory 500.

According to an exemplary embodiment of the present disclosure, the machine learning model stored in the memory 500 may include a deep learning model 512 and a reinforcement learning model 514.

According to another exemplary embodiment of the present disclosure, as illustrated in FIG. 3, the controller 400 and the memory 500 may be included in the server 10.

In this case, the server 10 may include a first communicator 312 which receives weather information, a second communicator 314 which collects operation information of the connected device 200 from the connected device 200, and a third communicator 316 which collects position information of the user, usage information of the vehicle 130, and biometric information from the mobile device 100.

Further, the air conditioner 300 may include a fourth communicator 318 which performs communication with the server 10.

The controller 400 of the server 10 analyzes the weather information, the operation information of the connected device 200, position information, movement information, and biometric information of the user, and the usage information of the vehicle 130 collected by means of the first communicator 312, the second communicator 314, and the third communicator 316. The controller 400 analyzes collected information by referring to the machine learning model also stored in the memory 500 and the air conditioner 300 may download the analyzed results through the fourth communicator 318 to control the operation manipulator 330.

The network may serve to connect the air conditioner 300 to the mobile device 100, the connected device 200, and the server 10. The network may include wired networks such as local area networks (LANs), wide area networks (WANs), metropolitan area networks (MANs), or integrated service digital networks (ISDNs) and wireless networks such as wireless LANs, CDMA, Bluetooth, and satellite communication, but the scope of the present disclosure is not limited thereto. Further, the network may transmit and receive information using near field communication and/or long-distance communication. Here, the near field communication may include Bluetooth, radio frequency identification (RFID), infrared data association (IrDA), ultra-wideband (UWB), Zigbee, and wireless fidelity (Wi-Fi) techniques and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) techniques.

The network may include connection of network elements such as a hub, a bridge, a router, a switch, and a gateway. A network may include one or more connected networks, for example, multiple network environments, including a public network such as the Internet and a private network such as a secure corporate private network. Access to the network may be provided by one or more wired or wireless access networks. Moreover, the network may support an Internet of Things (IoT) network which exchanges and processes information between distributed components such as objects and/or 5G communication.

Figure 4:
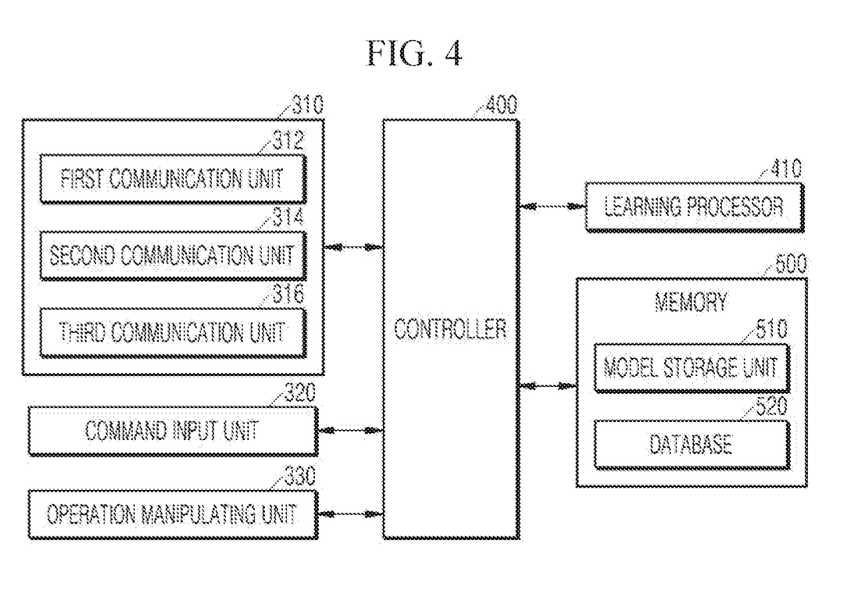
FIG. 4 is a block diagram of an air conditioner according to an exemplary embodiment of the present disclosure.

FIG. 4 is a block diagram of an air conditioner 300 according to an exemplary embodiment of the present disclosure.

As illustrated in FIG. 4, an air conditioner 300 according to the exemplary embodiment of the present disclosure may include a communicator 310, a command input 320, an operation manipulator 330, a controller 400, and a memory 500.

The controller 400 may include a learning processor 410 which performs machine learning and the memory 500 may include a model storage unit 510 which stores a machine learning model and a database 520 in which collected data or a program for operations are stored.

The communicator 310 may interwork with the network to provide a communication interface required to provide transmission and reception signals between the air conditioner 300, the mobile device 100, the connected device 200, and the server 10 in the form of packet data. Further, the communicator 310 may support various machine-to-machine communication (Internet of things (IoT) intelligent communication, Internet of everything (IoE), Internet of small things (IoST), etc.) and also support machine to machine (M2M) communication, vehicle to everything (V2X) communication, device to device (D2D) communication, and the like.

The command input 320 is equipped with a plurality of manipulating buttons and transmits signals corresponding to the input button to the controller 400. The command input 320 may be configured to selectively set various functions of the air conditioner 300 including a temperature setting. The command input 320 may be configured as a sensor, a button, or a switch structure which recognizes a touch or a pressing operation of the user. The command input 320 according to the exemplary embodiment of the present disclosure may be formed to be separated from a main body of the air conditioner 300, like the remote controller. Further, the command input may include information input through a program stored in the portable terminal 110.

The operation manipulator 330 may perform the operations implemented in the air conditioner 300 under the control of the controller 400. The operation manipulator 330 may determine a setting temperature for cooling or heating. Further, the operation manipulator 330 may determine whether to operate the air conditioner 300, a wind strength, a wind direction, and an operating mode.

The learning processor 410 according to the exemplary embodiment may be equipped at the outside of the controller 400 as illustrated in FIG. 4 or equipped in the controller 400 to operate as the controller 400 or provided in the server 10 in FIG. 1.

The controller 400 is a sort of central processing units and may drive a control program installed in the memory 500 to control an overall operation of the air conditioner 300.

The controller 400 may control the operation manipulator 330 to determine whether to operate the air conditioner 300, an operating mode, a wind strength, and a wind direction.

The controller 400 may include any types of devices which are capable of processing data such as a processor. Here, a processor may refer to, for example, a data processing device embedded in a hardware which has a physically structured circuit to perform a function expressed by a code or a command included in the program. Examples of the data processing device embedded in the hardware may include processing devices such as a microprocessor, a central processing unit (CPU), a processor core, a multiprocessor, an application-specific integrated circuit (ASIC), and a field programmable gate array (FPGA), but the scope of the present disclosure is not limited thereto.

According to an exemplary embodiment of the present disclosure, the controller 400 may perform machine learning such as deep learning to cool or heat the conditioning area by analyzing weather information and operation information of each of the connected devices 200 collected from the connected devices 200 and the memory 500 may store data used for the machine learning and result data.

A deep learning technique, which is a sort of machine learning, may learn using multiple layers to a deeper level based on data. The deep learning may indicate a set of machine learning algorithms which extract core data from a plurality of data as a level becomes higher.

The deep learning structure may include an artificial neural network (ANN) and for example, the deep learning structure may be configured by a deep neural network (DNN) such as a convolutional neural network (CNN), a recurrent neural network (RNN), and a deep belief network (DBN). The deep learning structure according to the exemplary embodiment of the present disclosure may use various known structures. For example, the deep learning structure according to the present disclosure may include CNN, RNN, DBN, and the like. The RNN is frequently used for natural language processing and is efficient for time-series data processing which changes in accordance with a flow of time. The RNN may form an artificial neural network structure by accumulating layers at every moment. The DBN may include a deep learning structure configured by accumulating multiple layers of restricted boltzman machines which are a deep learning technique. When the RBM learning is repeated to obtain a predetermined number of layers, the DBN having the corresponding number of layers may be configured. The CNN may include a model imitating a brain function of human created based on an assumption that when human recognizes an object, the human extracts basic features of the object and then the object is recognized based on a complex calculating result in the brain.

In the meantime, the artificial neural network may be trained by adjusting a weight (if necessary, also a bias value is adjusted) of a connection line between nodes to obtain a desired output for a given input. Further, the artificial neural network may consistently update the weight value by the learning. Further, the artificial neural network may be trained using a method such as back propagation.

In the meantime, an artificial neural network may be installed in the controller 400 and the controller 400 may recognize an environmental state of the conditioning area and a body condition of the user based on the machine learning using received weather information, operation information of each connected device 200, position information, movement information, and biometric information of the user, and usage information of the vehicle 130 as input data.

The controller 400 may include the artificial neural network, for example, a deep neural network (DNN) such as CNN, RNN, and DBN and learn the deep neural network. As the machine learning method of the artificial neural network, both unsupervised learning and supervised learning may be used. The controller 400 may control the artificial neural network structure to be updated after learning in accordance with a setting.

The memory 500 records various information required for the operation of the air conditioner 300 and may include a volatile or non-volatile recording medium. Here, the memory 500 may include magnetic storage media or flash storage media, but the scope of the present disclosure is not limited thereto. The memory 500 may include an embedded memory and/or an external memory and also include a volatile memory such as a DRAM, an SRAM, or an SDRAM, a non-volatile memory such as an one time programmable ROM (OTPROM), a PROM, an EPROM, an EEPROM, a mask ROM, a flash ROM, an NAND flash memory, or an NOR flash memory, a flash drive such as an SSD, a compact flash (CF) card, an SD card, a micro-SD card, a mini-SD card, an Xd card, or a memory stick, or a storage drive such as an HDD.

Figure 5:
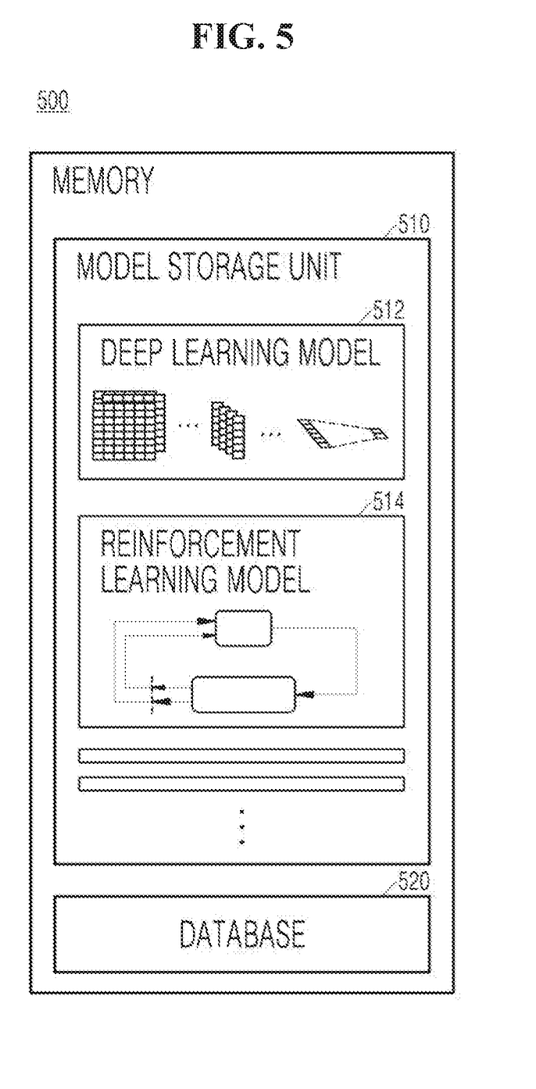
FIG. 5 is a block diagram of a memory of an air conditioner according to an exemplary embodiment of the present disclosure.

FIG. 5 is a block diagram illustrating a memory 500 of an air conditioner 300 according to an exemplary embodiment of the present disclosure.

As illustrated in FIG. 5, according to an exemplary embodiment of the present disclosure, the memory 500 includes a model storage unit 510 and a database 520.

In the model storage unit 510, a deep learning model 512 for performing deep learning and a reinforcement learning model 514 may be stored.

As described above, the controller 400 may analyze information by referring to the deep learning model 512 stored in the memory 500.

According to the exemplary embodiment of the present disclosure, operation information of each connected device 200 collected from the connected devices 200 is defined as a first data set.

The controller 400 performs analysis with the weather information, a manipulation command of the user, and the first data set as input values and the analysis is performed by referring to the deep learning model 512 stored in the model storage unit 510 of the memory 500. The analysis may derive a state of the conditioning area.

That is, it is derived whether the heating is necessary for the conditioning area or the cooling is necessary for the conditioning area and if the cooling is necessary, it is analyzed at which temperature needs to be manipulated for the air conditioner 300.

For example, when the cooker 260 among the connected devices 200 operates, the temperature of the conditioning area is increased so that the cooling is necessary for the temperature increase of the conditioning area. Further, when the treadmill 270 among the connected devices 200 operates, it is expected that the body temperature of the user is increased by the exercise. The controller 400 may analyze the state of the conditioning area through the first data set to derive a first customized value.

In the deep learning which derives the first customized value through the first data set, the combination of the connected devices 200 may vary in accordance with the indoor space where the air conditioner 300 is installed. Therefore, the first data set may be analyzed by the unsupervised learning to derive the first customized values. However, in this case, the analysis reliability at the initial stage may be low, but the analysis reliability may be improved by data accumulated as the deep learning is performed.

Figure 6:
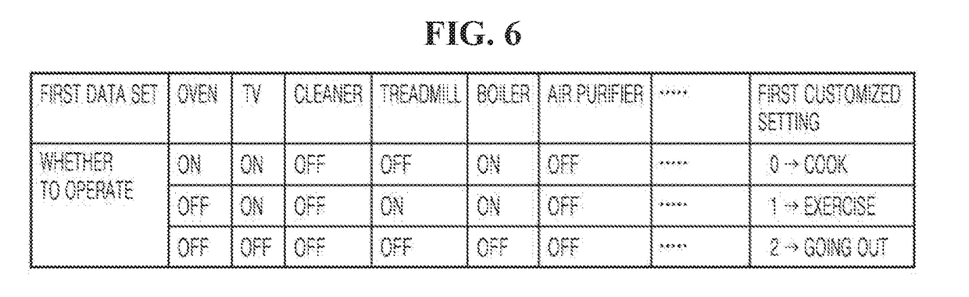
FIG. 6 is a table of an example in which a first customized value is derived in accordance with a first data set in an air conditioner according to an exemplary embodiment of the present disclosure.

FIG. 6 is a table of an example in which a first customized value is derived in accordance with a first data set in an air conditioner 300 according to an exemplary embodiment of the present disclosure.

As illustrated in FIG. 6, the controller 400 or the learning processor 410 may collect operating states of the connected devices 200 connected to the air conditioner 300. Operation information of each of the plurality of connected devices 200 is analyzed by the controller 400 or the learning processor 410 to derive the state of the conditioning area and the first customized value may be determined to control the air conditioner 300 in accordance with the derived state of the conditioning area.

According to the exemplary embodiment of the present disclosure, the position information, the movement information, and the biometric information of the user and the usage information of the vehicle 130 which are collected from the mobile devices 100 are defined as a second data set.

The controller 400 performs analysis with the second data set or the weather information, a manipulation command of the user, and the second data set as input values and the analysis is performed by referring to the deep learning model 512 stored in the model storage unit 510 of the memory 500. The analysis is performed to control the cooling or the heating of the conditioning area in accordance with the state of the user by modifying the first customized value.

For example, when the cooling or the heating of the conditioning area is derived by the first customized value, if the user returns to the conditioning area after being exposed to a hot outside weather without using the vehicle 130, the user is likely to be unsatisfied with the operating state of the air conditioner 300 which operates at the first customized value.

Since the first customized value is a result obtained by performing the deep learning to derive the state of the conditioning area, this results from not reflecting the body condition or the activity state of the user.

Therefore, the position information, the movement information, and the biometric information of the user and the usage information of the vehicle 130 which are information indicating a body condition or an activity state of the user are collected by the portable terminal 110, the wearable device 120, and the vehicle 130 and the information is analyzed to derive a second customized value obtained by modifying the first customized value.

Figure 7:
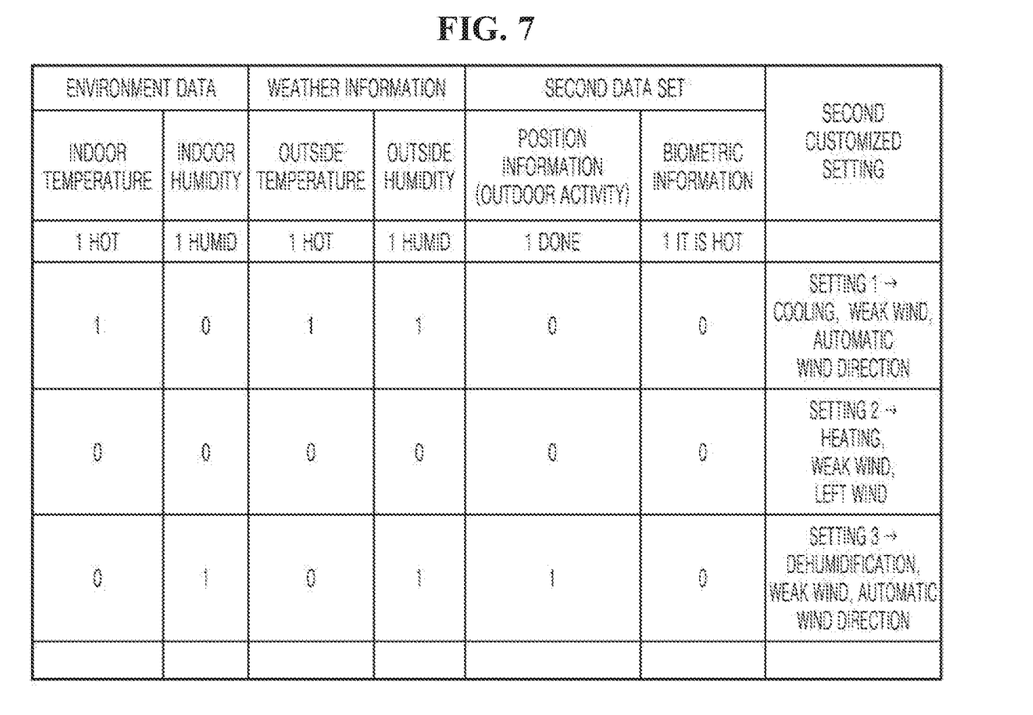
FIG. 7 is a table of an example in which a second customized value is derived in accordance with a second data set in an air conditioner according to an exemplary embodiment of the present disclosure.

FIG. 7 is a table of an example in which a second customized value is derived in accordance with a second data set in an air conditioner 300 according to an exemplary embodiment of the present disclosure.

As illustrated in FIG. 7, the second data set may be analyzed together with environment data such as an indoor temperature and humidity of the conditioning area and weather information such as outdoor temperature or humidity.

The second data set is analyzed to perform a customized cooling/heating required for the user based on the activity information and the biometric information of the user.

Therefore, the first customized value is modified in accordance with the user and the activity information and the biometric information collected from the user are analyzed to derive the second customized value. This is also performed by the controller 400 and/or the learning processor 410 and to perform this, the controller 400 and/or the learning processor 410 may call the deep learning model 512 stored in the model storage unit 510 of the memory 500.

According to the exemplary embodiment of the present disclosure, under the situation in which the air conditioner 300 operates at the first customized value or the second customized value, the user may manually manipulate the command input 320 to input an additional manipulation command. When the manipulation is additionally input through the command input 320 under the situation in which the air conditioner 300 operates at the first customized value or the second customized value, it is defined as additional manipulation information.

When the additional manipulation information is input, the deep learning model 512 which was referred to to derive the first customized value and/or the second customized value may be modified.

It may be determined that even though the air conditioner 300 is controlled with the first customized value and/or the second customized value which were derived by the deep learning, the pleasant environment which the user wants is not derived. Therefore, the deep learning model 512, which was referred to to derive the first customized value and/or the second customized value, is modified based on the additional manipulation information input by the user to construct more precise deep learning model 512.

The deep learning model 512 is modified by the reinforcement learning.

Figure 8:
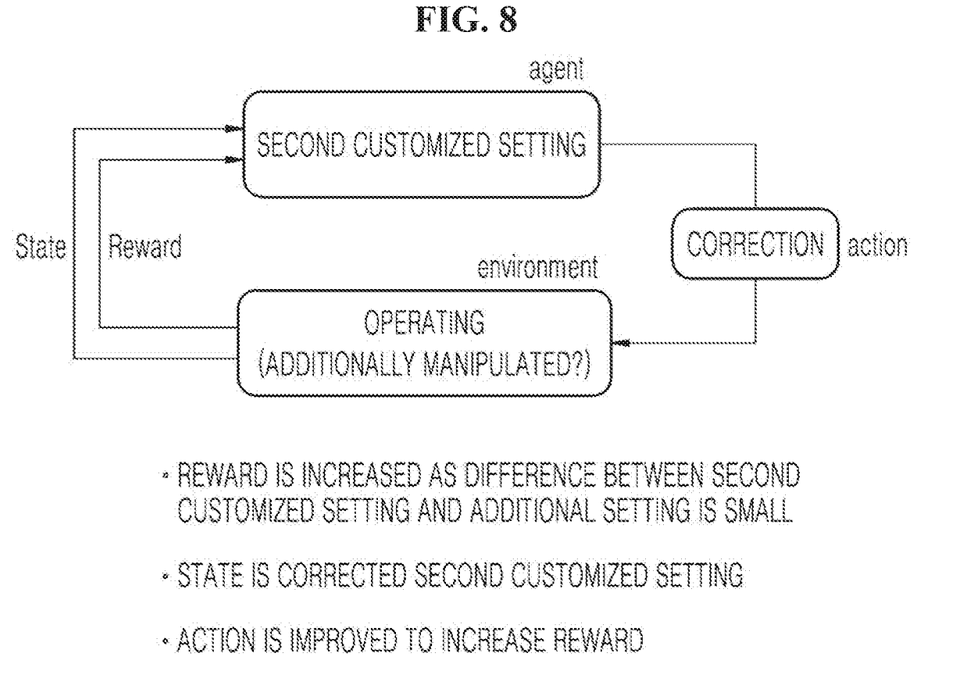
FIG. 8 is an exemplary view for explaining a reinforcement learning model in an air conditioner according to an exemplary embodiment of the present disclosure.

FIG. 8 is an exemplary view for explaining a reinforcement learning model in an air conditioner 300 according to an exemplary embodiment of the present disclosure.

The reinforcement learning is a part of the machine learning. This is a method in which an agent which is defined in a given environment recognizes a current state and selects an action or an order of actions which maximizes a reward, among selectable actions.

As illustrated in FIG. 8, when the second customized value is described as an example, the agent is a second customized value. When an environment in which additional manipulation information is input during the operation of the air conditioner 300 at the second customized value is set, the action is taken to maximize the defined reward.

Specifically, according to the exemplary embodiment of the present disclosure, the smaller the difference between the second customized value and additional setting by the additional manipulation information, the larger the reward. When the reward is large, it means that the difference between additional setting by the additional manipulation information and the second customized value is small.

Therefore, the action which corrects the second customized value is taken such that the additional setting by the additional manipulation information is close to the second customized value to maximize the reward.

Therefore, when the additional manipulation information is input, the controller 400 modifies and supplements the deep learning model 512 such that the additional setting has a value close to the second customized value.

The modified and supplemented deep learning model 512 is referred to to derive the second customized value thereafter and the deep learning model is repeatedly modified and supplemented in accordance with the input of the additional manipulation setting by the user. As a series of reinforcement learning processes described above is repeatedly performed, the analysis reliability of the deep learning model 512 which is referred to to derive the second customized value is increased.

When the first customized value is derived, the reinforcement learning process may be applied in the same way.

Figure 9:
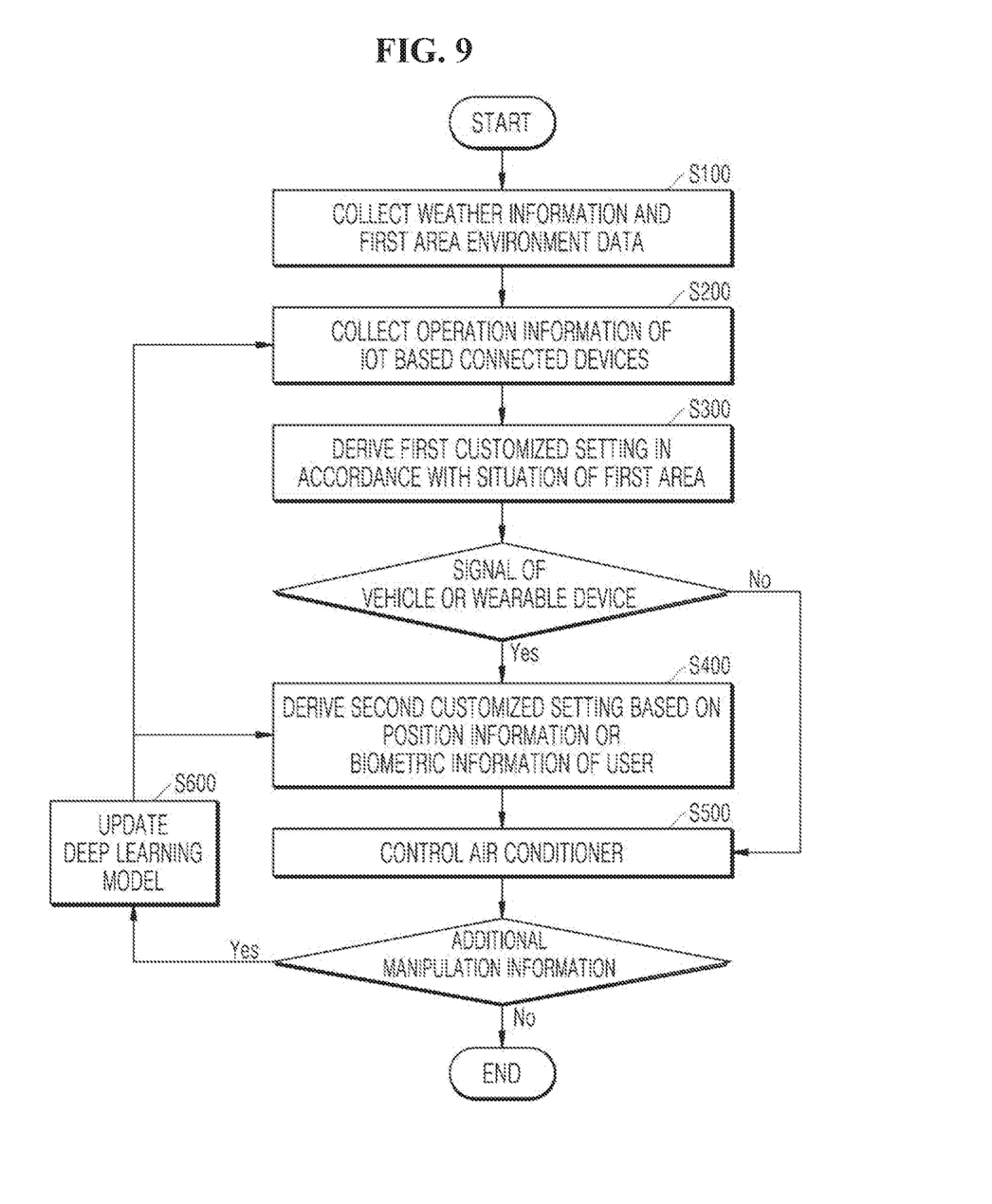
FIG. 9 is a flowchart illustrating an operating method of an air conditioner according to an exemplary embodiment of the present disclosure.

FIG. 9 is a flowchart illustrating an operating method of an air conditioner 300 according to an exemplary embodiment of the present disclosure.

A method of controlling an air conditioner 300 according to the present disclosure will be described with reference to FIG. 9.

An operating method of an air conditioner 300 according to the present disclosure is a method for operating an air conditioner 300 by utilizing information collected through external devices.

To this end, in a first step S100, weather information and environment data including a temperature and a humidity of a conditioning area where the air conditioner 300 is installed are collected.

The communicator 310 may communicate with an external server 10 in which the weather information is stored to download the weather information. The communication may be performed by means of wireless or wired connection with an Internet network.

In a second step S200, a first data set which is operation information of each of a plurality of connected devices 200 located in the conditioning area is collected. The air conditioner 300 may directly communicate with the connected device 200 to download and collect the first data set.

Alternatively, the connected devices 200 and the server 10 communicate with each other so that the first data set is stored in the server 10 and the air conditioner 300 may download the first data set stored in the server 10.

Communication performed between the connected device 200 and the air conditioner 300 and the communication performed between the connected device 200, the server 10, and the air conditioner 300 may be performed by the 5G environment and/or IoT network which are connected for the Internet of Things.

In a third step S300, a first customized value may be calculated based on the environment data and the first data set. The first customized value may be analyzed by the controller 400 and/or the learning processor 410 and to perform this, the controller 400 and/or the learning processor 410 may call the deep learning model 512 stored in the model storage unit 510 of the memory 500.

In a fourth step S400, a second customized value is calculated by modifying the first customized value based on a second data set which is position information and biometric information of the user. The second customized value may be calculated by the deep learning analysis performed by the controller 400 and/or the learning processor 410.

In a fifth step S500, at least one of whether to operate the air conditioner 300, an operation mode, a wind volume, and a wind direction is controlled in accordance with the first customized value or the second customized value. When the position information or the biometric information of the user for performing the fourth step S400 is not input, the air conditioner 300 may be controlled in accordance with the first customized value. When the position information or the biometric information of the user is input, the air conditioner 300 is controlled in accordance with the second customized value derived by performing the fourth step S400.

A sixth step S600 may be performed when additional manipulation information is input by the user. In the sixth step, the deep learning model 512 which was referred to derive the first customized value and/or the second customized value is modified based on the additional manipulation information. By doing this, the first customized value and/or the second customized value is updated.

In this case, the deep learning model 512 may be modified by the reinforcement learning by which the reward is increased as a difference between additional setting input by the additional manipulation information and the first customized value and/or the second customized value is reduced.

It will of course be realized that while the foregoing has been given by way of illustrative example of this disclosure, all such and other modifications and variations thereto as would be apparent to those skilled in the art are deemed to fall within the broad scope and ambit of this disclosure as is herein set forth.

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. An air conditioner which cools or heats a conditioning area, comprising:
    a communication interface configured to collect weather information and operation information of at least one connected device and to collect position information of a user and biometric information of the user from a wearable device worn by the user;
    a touchable or pressable input configured to receive a manipulation command of a user;
    a first controller configured to: adjust at least one of whether to operate the air conditioner for operating in a cooling mode or a heating mode, a temperature, a wind volume, or a wind direction of the air conditioner; and
    a second controller configured to:
        derive a first customized value based on the manipulation command input through the touchable or pressable input and collected weather information and operation information of at least one connected device;
        derive a second customized value based on the first customized value and the position information of the user and the biometric information of the user; and
        control the first controller in accordance with the second customized value,
        wherein the second customized value is derived by performing the deep learning to select at least one of a plurality of manipulation settings obtained by combination of whether to operate the air conditioner for operating in the cooling mode or the heating mode, the temperature, the wind volume, and the wind direction with the first customized value, the position information, and the biometric information of the user as input values.

2. The air conditioner according to claim 1, wherein the communication interface includes:
    a first communication interface configured to access a server using wireless communication to collect the weather information; and
    a second communication interface configured to receive operation information of the at least one connected device, and
    wherein the second controller is configured to predict a state of the conditioning area by performing deep learning with the operation information of the at least one connected device to determine the first customized value.

3. The air conditioner according to claim 2, wherein the second controller defines the operation information of the at least one connected device as a first data set, and
    wherein the second controller is configured to analyze the first data set by a deep learning model which is trained by unsupervised learning.

4. The air conditioner according to claim 2, wherein the at least one connected device is a home appliance having a function of the Internet of Things.

5. The air conditioner according to claim 2, wherein the second controller includes:
    a learning processor configured to perform machine learning using information input through at least one of the first communication interface, the second communication interface, and the touchable or pressable input to calculate the first customized value; and
    a memory configured to store a learning model which is referred to by the learning processor and the first customized value calculated by the learning processor.

6. The air conditioner according to claim 5, wherein the learning model includes:
    a deep learning model for performing deep learning; and
    a reinforcement learning model for performing reinforcement learning,
    wherein the learning processor is configured to learn by selectively referring to the deep learning model and the reinforcement learning model from the memory, and
    wherein the learning processer is configured to update an algorithm of the deep learning model or the reinforcement learning model in accordance with the learning to store the algorithm of the deep learning model or the reinforcement model in the memory.

7. The air conditioner according to claim 1, wherein the second controller is configured to perform reinforcement learning based on additional manipulation information of the user which is input through the touchable or pressable input when the first controller is controlled in accordance with the second customized value, and
    wherein the second controller is configured to update the second customized value such that a difference between an additional setting changed by the additional manipulation information and the second customized value is reduced.

8. The air conditioner according to claim 1, wherein the second controller is configured to perform reinforcement learning based on additional manipulation information of the user which is input through the touchable or pressable input when the first controller is controlled in accordance with the first customized value, and
    wherein the second controller is configured to update the first customized value such that a difference between an additional setting changed by the additional manipulation information and the first customized value is reduced.

9. The air conditioner according to claim 1, wherein the second controller includes:
- a learning processor configured to perform machine learning using information input through at least one of the first communication interface and the touchable or pressable input to calculate the first customized value; and
- a memory configured to store a learning model which is referred to by the learning processor and the first customized value calculated by the learning processor.

10. A method for operating an air conditioner using information collected by an external device, the method comprising:
- collecting weather information and environment data including a temperature and a humidity of a conditioning area where the air conditioner is installed;
- collecting a first data set which is operation information of at least one connected device located in the conditioning area;
- calculating a first customized value based on the environment data and the first data set, by a controller;
- collecting a second data set which includes position information of a user and biometric information including a body temperature and a heart rate of the user from a wearable device worn by the user;
- calculating a second customized value by modifying the first customized value based on the second data set, by the controller;
- controlling at least one of whether to operate the air conditioner, an operation mode of the air conditioner, a wind volume of the air conditioner, and a wind direction of the air conditioner in accordance with the first customized value or the second customized value; and
- updating the first customized value or the second customized value based on additional manipulation information when the user inputs the additional manipulation information, wherein, in calculating the first customized value based on the environment data and the first data set, a combination of whether to operate the air conditioner, the operation mode, the wind volume, and the wind direction predicted by performing deep learning with the first data set as an input value is selected as the first customized value, and wherein, in calculating the second customized value by modifying the first customized value based on the second data set, a combination of whether to operate the air conditioner, the operation mode, the wind volume, and the wind direction predicted by performing deep learning with the second data set as an input value is selected as the second customized value.

11. The method according to claim 10, wherein, in updating the first customized value or the second customized value, the first customized value or the second customized value is updated such that a difference between an additional setting changed by the additional manipulation information and the first customized value or the second customized value is reduced.

12. A non-transitory computer readable recording medium recording a computer program to execute the method according to claim 10 using a computer.

* * * * *